(12) United States Patent
Okazaki

(10) Patent No.: US 8,925,704 B2
(45) Date of Patent: *Jan. 6, 2015

(54) CLUTCH DEVICE

(75) Inventor: Masaharu Okazaki, Okayama (JP)

(73) Assignee: OS Giken Co., Ltd., Okayama-shi (JP)

( * ) Notice: Subject to any disclaimer, the term of this patent is extended or adjusted under 35 U.S.C. 154(b) by 743 days.

This patent is subject to a terminal disclaimer.

(21) Appl. No.: 12/777,535

(22) Filed: May 11, 2010

(65) Prior Publication Data

US 2010/0288596 A1 Nov. 18, 2010

(30) Foreign Application Priority Data

May 14, 2009 (JP) ................................. 2009-117094
Mar. 12, 2010 (JP) ................................. 2010-056177

(51) Int. Cl.
| F16D 13/56 | (2006.01) |
| F16D 13/71 | (2006.01) |
| F16D 13/72 | (2006.01) |
| F16D 13/58 | (2006.01) |
| F16D 13/70 | (2006.01) |

(52) U.S. Cl.
CPC .............. F16D 13/585 (2013.01); F16D 13/70 (2013.01)
USPC .................. 192/70.12; 192/70.27; 192/89.23; 192/109 A; 192/113.23

(58) Field of Classification Search
CPC .......... F16D 13/56; F16D 13/71; F16D 13/72
USPC ....... 192/66.31, 89.23, 109 A, 70.27, 113.22, 192/113.23, 70.12
See application file for complete search history.

(56) References Cited

U.S. PATENT DOCUMENTS

| 2,251,366 A | * | 8/1941 | Miller et al. | ............... | 192/70.22 |
| 2,630,897 A | * | 3/1953 | Porter | ......................... | 192/89.23 |
| 2,770,341 A | * | 11/1956 | Wobrock | ................... | 192/70.12 |
| 3,323,624 A | * | 6/1967 | Jean | ........................... | 192/89.23 |

(Continued)

FOREIGN PATENT DOCUMENTS

JP 9-250556 9/1997

OTHER PUBLICATIONS

"OS GIKEN: Street Master", Options, Aug. 26, 2009, 116-117.*

(Continued)

*Primary Examiner* — Gene Crawford
*Assistant Examiner* — Terry Chau
(74) *Attorney, Agent, or Firm* — Kratz, Quintos & Hanson, LLP

(57) ABSTRACT

The present invention is to provide a clutch device that keeps a half-clutch range wide for a long time. A clutch device 1 is arranged in such a manner that an intermediate ring 24 is disposed on the pressure plate 23 so as to be slightly movable in a direction of pressing by a diaphragm spring 21; air passageways 31 are radially disposed at regular circumferential intervals between the intermediate ring 24 and the pressure plate 23 so as to let the inner and outer peripheries communicate with each other; plate springs 25 are disposed in the air passageways 31 to bias constantly the intermediate ring 24 and the pressure plate 23 in a direction of separating from each other; and a force of the pressing operation by the diaphragm spring 21 is transferred to the pressure plate 23 via the intermediate ring 24 and the plate springs 25.

9 Claims, 11 Drawing Sheets

(56) References Cited

U.S. PATENT DOCUMENTS

| | | | |
|---|---|---|---|
| 4,095,683 A * | 6/1978 | Ban | 192/70.18 |
| 4,291,792 A * | 9/1981 | Henao | 192/89.23 |
| 4,828,083 A * | 5/1989 | Naudin | 192/52.3 |
| 5,205,388 A * | 4/1993 | Hashimoto et al. | 192/89.1 |
| 5,351,796 A * | 10/1994 | Uenohara | 192/70.27 |
| 5,375,688 A * | 12/1994 | Hays | 192/70.27 |
| 5,499,704 A * | 3/1996 | Hays | 192/70.27 |
| 5,509,518 A * | 4/1996 | Zelikov | 192/70.252 |
| 5,765,674 A * | 6/1998 | Schierling | 192/89.23 |
| 6,016,897 A * | 1/2000 | Bacher | 192/70.27 |
| 6,419,062 B1 * | 7/2002 | Crowe | 192/52.6 |
| 2003/0234149 A1 * | 12/2003 | Peterseim et al. | 192/70.14 |
| 2008/0078643 A1 * | 4/2008 | Yetzke | 192/109 A |

OTHER PUBLICATIONS

Pages 116-117 of the magazine OPTION (Aug. 26, 2009) in both Japanese and English, including verification of translation.

* cited by examiner

CLUTCH DEVICE

TECHNICAL FIELD

The present invention relates to an automobile clutch device that transfers a rotating force of an engine to a transmission or severs the same.

BACKGROUND ART

There is a widely employed arrangement of automobile clutch devices in which: a pressure plate rotating integrally with a flywheel is pressed via a diaphragm spring toward the flywheel to thereby sandwich clutch plates rotating integrally with an input shaft of a transmission between the flywheel and the pressure plate and transfer a rotating force of an engine to the transmission; and the pressure plate is released from the pressing operation of the diaphragm spring to thereby let clutch plates run idle between the flywheel and the pressure plate and sever the transfer of rotating force from the engine to the transmission.

A widely used universal clutch device for general automobiles has cushion plates interposed between clutch plates for smooth clutch operations, thereby making the depression range of a clutch pedal wider to obtain a half-clutch state. For racing cars, however, a clutch is configured so as to achieve shift transmission in a short time and no cushion plates are provided to minimize inertial weights of clutch plates and lighten a load on the transmission as much as possible. This makes the depression range of a clutch pedal narrow to obtain a half-clutch state (hereinafter, referred to as simply half-clutch range). Accordingly, there is a problem that the clutch is engaged more quickly than expected, thereby bringing about a shock.

To prevent generation of such a shock, there has been proposed a clutch device with a wider half-clutch range in which a cushion ring is provided between the pressure plate and the diaphragm spring; the plane of the pressure plate facing the cushion ring is formed in a tapered shape; a gap is created between the pressure plate and the inner periphery of the cushion ring; and the gap is used to deform the cushion ring elastically toward the pressure plate (refer to Patent Document 1, for example).

[Patent Document 1] JP-A No. 9-250556

SUMMARY OF THE INVENTION

Problem to be Solved by the Invention

In such a clutch device as disclosed in Patent Document 1, a spring force of a cushion ring is utilized to set a wide half-clutch range. However, since the cushion ring and the pressure plate are formed in annular shapes, a flow of air is interrupted between the inner and outer peripheries of the cushion ring and the pressure plate, the cushion ring is thermally deteriorated by friction heat due to clutch operations and is decreased in spring characteristics, thereby to make the half-clutch range narrow in a short time.

An object of the present invention is to provide a clutch device that keeps the half-clutch range wide for a long time.

Means to Solve the Problem

A clutch device of the present invention is arranged in such a manner that: a pressure plate rotating integrally with a flywheel is pressed via a diaphragm spring toward the flywheel to thereby sandwich clutch plates rotating integrally with an input shaft of a transmission between the flywheel and the pressure plate and transfer a rotating force of an engine to the transmission; and the pressure plate is released from the pressing operation of the diaphragm spring to thereby let the clutch plates run idle between the flywheel and the pressure plate and sever the transfer of rotating force from the engine to the transmission, wherein an intermediate ring is disposed on the pressure plate between the pressure plate and the diaphragm spring so as to be slightly movable in a direction of pressing by the diaphragm spring; air passageways are disposed at regular circumferential intervals between the intermediate ring and the pressure plate so as to let the inner and outer peripheries communicate with each other; a plate spring is disposed in the air passageways to bias constantly the intermediate ring and the pressure plate in a direction of separating from each other, in such a manner that one end thereof is fixed to one of the intermediate ring and the pressure plate and the other end thereof is in contact with the other one of the intermediate ring and the pressure plate; and a force of the pressing operation by the diaphragm spring is transferred to the pressure plate via the intermediate ring and the plate springs.

In this clutch device, when the clutch pedal is not depressed, the intermediate ring, the plate springs, and the pressure plate are collectively pressed toward the flywheel by a biasing force of the diaphragm spring, the clutch plates are sandwiched in a non-slidable manner between the pressure plate and the flywheel to engage the clutch, and then a rotating force of the engine is transferred to the input shaft of the transmission. At that time, the plate springs are elastically deformed by the biasing force of the diaphragm spring to hold the intermediate ring and the pressure plate close to each other.

Meanwhile, when the clutch pedal is depressed, the diaphragm spring is separated from the intermediate ring, the clutch plates run idle between the pressure plate and the flywheel to disengage the clutch, whereby a rotating force of the engine will not be transferred to the transmission. At that time, the plate spring tries to return to its original shape, and therefore the intermediate ring and the pressure plate are held separated from each other.

When the depressed clutch pedal is somewhat released, the intermediate ring, the plate spring, and the pressure plate are pressed by the diaphragm spring toward the flywheel. Firstly, the clutch plates slide over the pressure plate and the flywheel to bring about a half-clutch state in which part of the rotating force is transferred to the clutch plates. When the clutch pedal is further released, the plate spring is elastically deformed by the biasing force of the diaphragm spring to maintain the half-clutch state. When the clutch is still further released, the clutch plates are sandwiched in a non-slidable manner between the pressure plate and the flywheel to thereby engage the clutch.

As stated above, this clutch device allows a half-clutch state to be created by the diaphragm spring and the plate spring, which makes the half-clutch range wider as compared to the case of creating a half-clutch state only by the diaphragm spring. In addition, the clutch device makes it possible to improve operability of clutch engagement and prevent effectively occurrence of a shock due to rapid clutch engagement. Further, since air passageways are provided at regular circumferential intervals between the intermediate ring and the pressure plate in such a manner as to let the inner and outer peripheries communicate with each other, flows of air are generated in the air passageways from the inner to outer peripheries when the intermediate ring and the pressure plate rotate integrally with the flywheel. Provided in the air passageways, the plate springs can be cooled down efficiently by the air passing through the air passageways. Accordingly, it is possible to prevent effectively the plate springs from being thermally deteriorated by friction heat due to clutch operations, keep the half-clutch range wide for a long time, and prevent effectively occurrence of a shock resulting from rapid clutch engagement for a long time.

In a preferred embodiment, gaps are created between the intermediate ring, the pressure plate, and front and back sides of the plate springs, and the plate springs are disposed in the air passageways. In this case, it is possible to increase areas of contact between the plate springs and the air passing through the air passageways as much as possible so as to cool down the plate springs efficiently. It is also possible to form asperities or grooves on the front and back sides of the plate springs so that the plate springs can be increased in surface area and enhanced in thermal dissipation property.

In another preferred embodiment, each of the plate springs is fixed at one end to the pressure plate on the outer circumferential side of the intermediate ring. In this case, it is possible to facilitate air-cooling of the plate springs at the portions fixed to the pressure plate and prevent the plate springs from being thermally deteriorated.

In still another preferred embodiment, a steel ball is embedded and fixed to one of the intermediate ring and the pressure plate in such a manner as to be partly exposed to the outside, and the other ends of the plate springs are in contact with the steel ball. Such an arrangement allows point contact via the steel ball between one of the intermediate ring and the pressure plate and the other ends of the plate springs. Therefore, it is possible to minimize heat transfer from one of the intermediate ring and the pressure plate to the plate springs and prevent further effectively the plate springs from being thermally deteriorated due to temperature increase.

In still another preferred embodiment, the plate springs are each fixed at one end to one of the intermediate ring and the pressure plate on the outer peripheral side of a sliding part between the clutch plate and the pressure plate. In this case, the portions of the plate springs fixed to the intermediate ring or the pressure plate are positioned on the outer peripheral side of the sliding part generating heat in a half-clutch state. Therefore, it is possible to minimize heat transfer to the plate springs and prevent the plate springs from decreasing in spring characteristics due to thermal deterioration. Preferably, the plate springs are fixed to one of the intermediate ring and the pressure plate at positions separated from the sliding part as much as possible.

In still another preferred embodiment, the parts of the intermediate ring contacting with the diaphragm spring are formed in a ring shape with an angle section at regular circumferential intervals, air grooves for cooling down the diaphragm spring are formed between adjacent contact parts, and the intermediate ring is coupled to the pressure plate in the air grooves. With such an arrangement, the air grooves in the intermediate ring can be used to fix the intermediate ring to the pressure plate by bolts, rivets or the like. Accordingly, it is possible to provide a coupled structure of the intermediate ring and the pressure plate without decreasing the clutch device in abilities to be assembled and processed.

The intermediate ring may have a biasing means for biasing constantly the diaphragm spring toward contact with the intermediate ring. In this case, the intermediate ring tries to move integrally with the diaphragm spring by a biasing force of the biasing means, and therefore it is possible to improve crispness in clutch disengagement significantly and realize smooth and quick shift transmission. Such smooth and quick shift transmission makes it possible to protect the transmission with raised durability. In addition, this arrangement provides reliable response to rapid shift transmission, which can contribute to acceleration of times in races or others. Further, when the intermediate ring, the plate springs, and the pressure plate become operated positively and the clutch pedal is depressed, the clutch can be surely disengaged to absorb discomfort vibrations such as judder by elastic deformation of the plate springs in a reliable manner. Meanwhile, when the clutch pedal is released, engine output can be transferred in a reliable manner. The biasing means may be fixed to the pressure plate, not to the intermediate ring. In this case, however, the plate springs are elastically deformed by a biasing force of the biasing means, thereby making the half-clutch range narrower. In addition, vibrations such as judder may be generated in a half-clutch state as in conventional devices, or the clutch may be deteriorated in operability at clutch engagement. Accordingly, the biasing means is preferably provided on the intermediate ring so as not to exert any influence on elastic deformation of the plate springs.

As the biasing means, hook-shaped spring members may be disposed on the intermediate ring at preset circumferential intervals in such a manner that one end thereof is hooked on the outer periphery of the diaphragm spring and the other end thereof is fixed to the intermediate ring. When such hook-shaped spring members are used as the biasing means and fitted to the intermediate ring, it is possible to attach the diaphragm spring to the clutch device by engaging the spring members with the outer periphery of the diaphragm spring while deforming elastically the spring members. This increases the diaphragm spring in ability to be attached to the clutch device. In addition, by providing the spring members at preset circumferential intervals, it is possible to allow a biasing force of the spring members to act on the diaphragm spring in a well-balanced manner.

Effect of the Invention

According to the clutch device in the present invention, a half-clutch state is created by the diaphragm spring and the plate spring, which makes the half-clutch range wider as compared to the case of creating a half-clutch state only by the diaphragm spring. In addition, the clutch device makes it possible to improve operability of clutch engagement and prevent effectively occurrence of a shock due to rapid clutch engagement. Further, since air passageways are provided at regular circumferential intervals between the intermediate ring and the pressure plate in such a manner as to let the inner and outer peripheries communicate with each other, flows of air are generated in the air passageways from the inner to outer peripheries when the intermediate ring and the pressure plate rotate integrally with the flywheel. Provided in the air passageways, the plate springs can be cooled down efficiently by the air passing through the air passageways. Accordingly, it is possible to prevent effectively the plate springs from being thermally deteriorated by friction heat due to clutch operations, keep the half-clutch range wide for a long time, and prevent effectively occurrence of a shock resulting from rapid clutch engagement for a long time.

EMBODIMENTS FOR CARRYING OUT THE INVENTION

Embodiments of the present invention will be described below with reference to the drawings. In addition, in the description of the embodiments, it is assumed that an engine is positioned on the front side and a transmission on the rear side.

Figure 1:
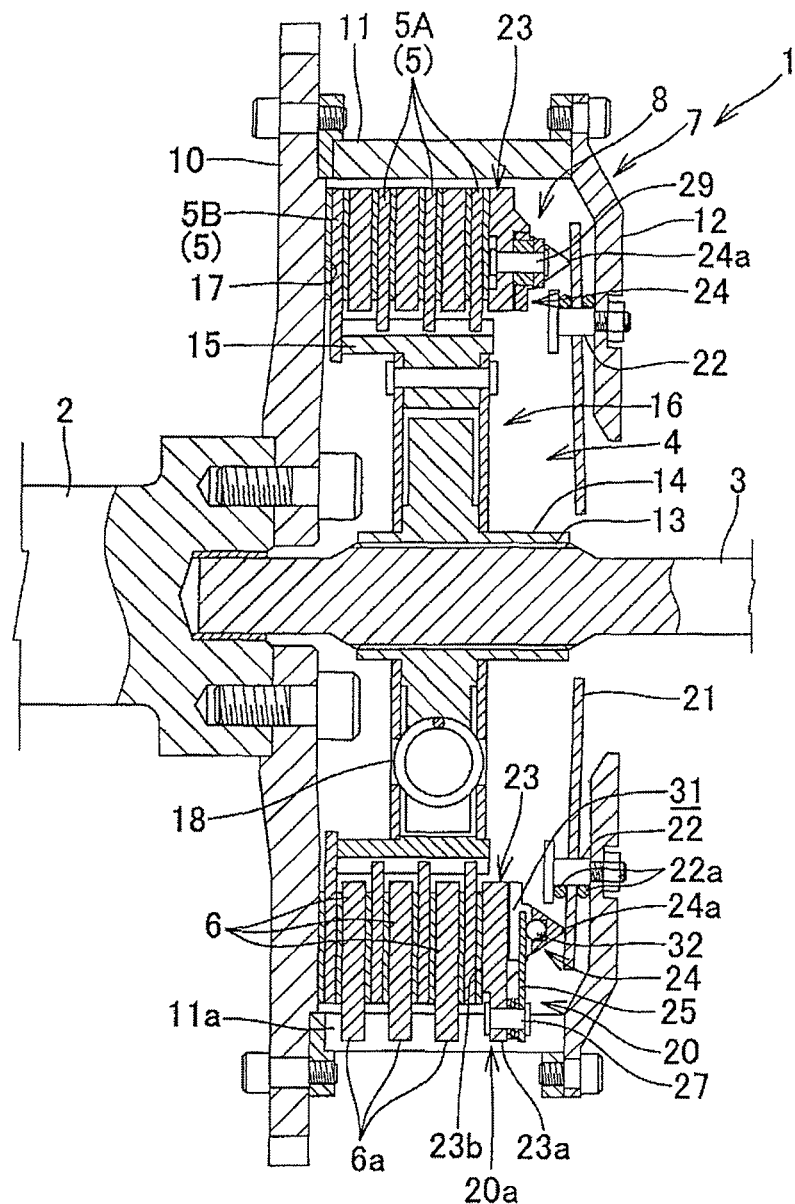
FIG. 1 is a vertical section view of a clutch device.
Figure 2:
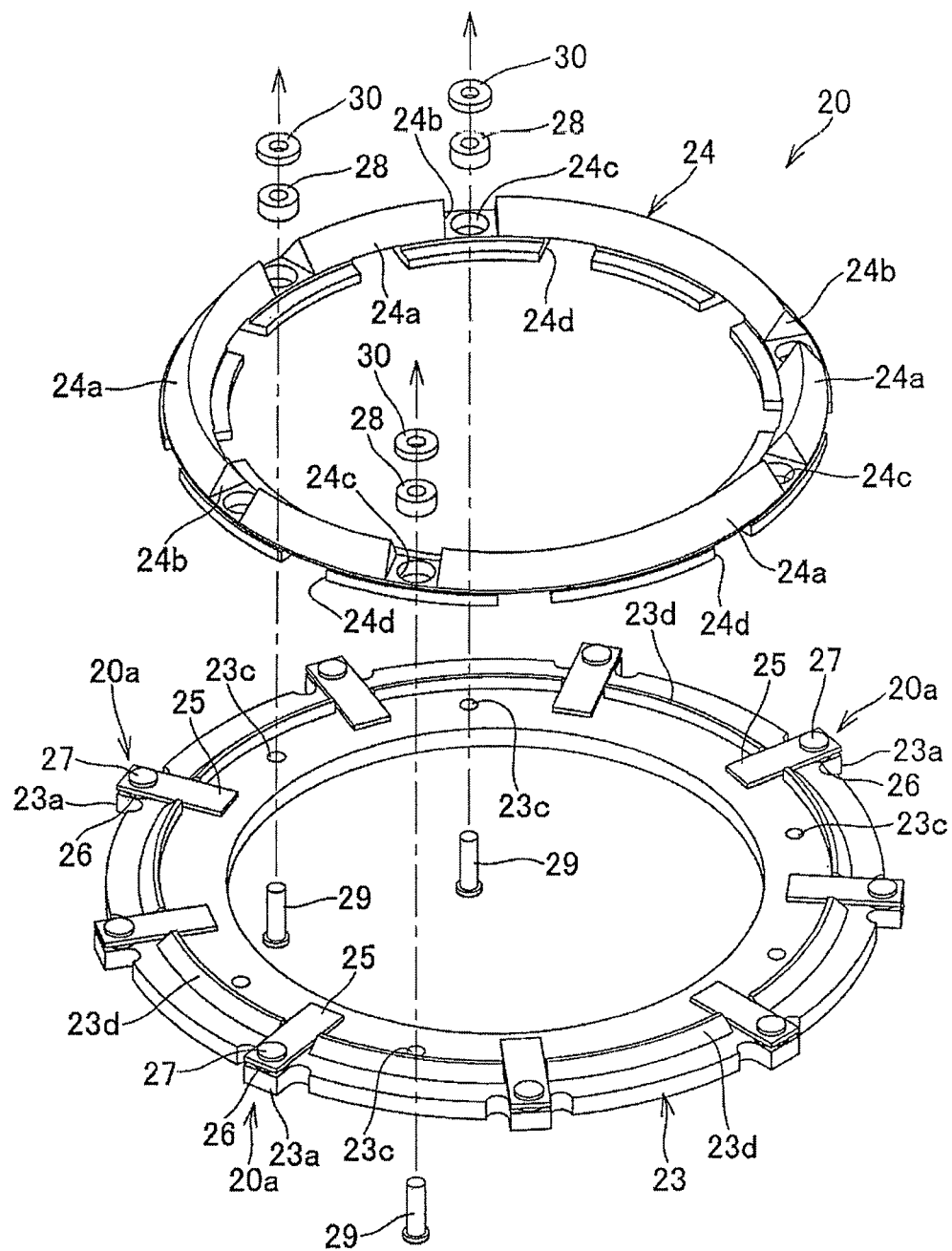
FIG. 2 is an exploded perspective view of a pressure plate assembly.
Figure 3:
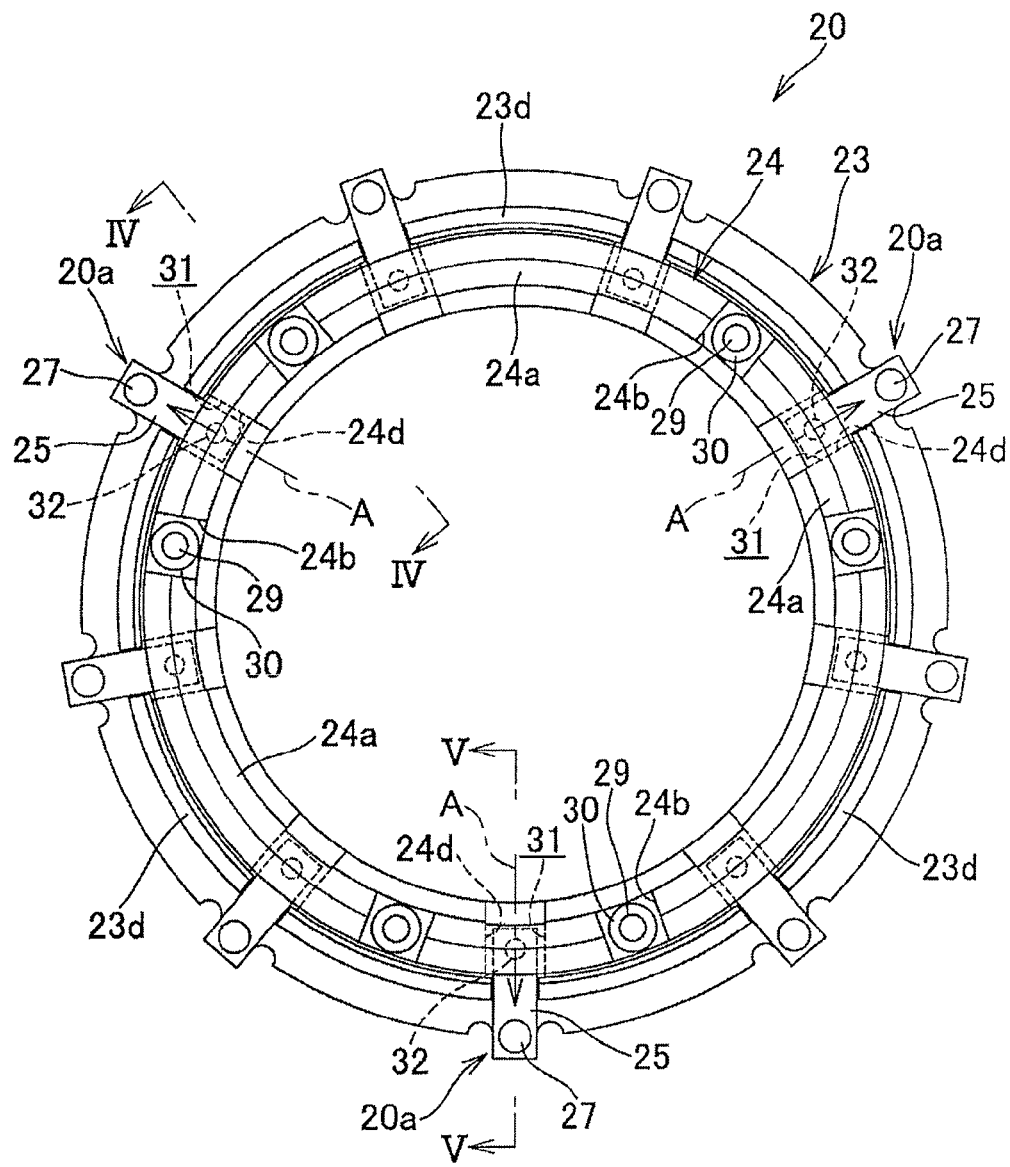
FIG. 3 is a front view of the pressure plate assembly.
Figure 4:
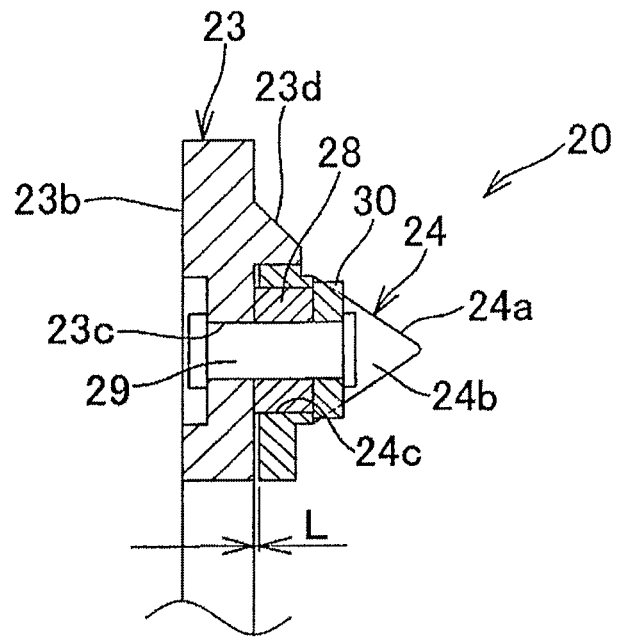
FIG. 4 is a cross section view of FIG. 3 along IV-IV line.
Figure 5:
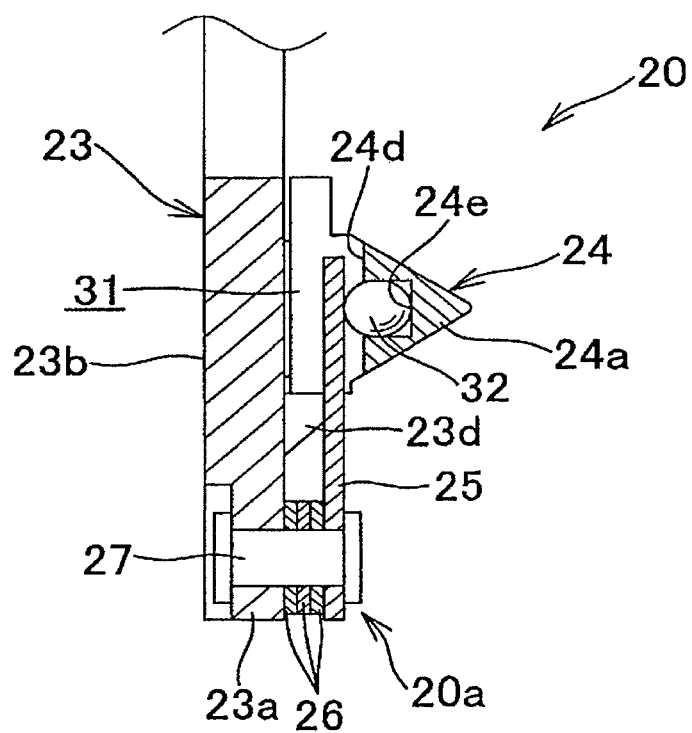
FIG. 5 is a cross section view of FIG. 3 along V-V line.
Figure 6:
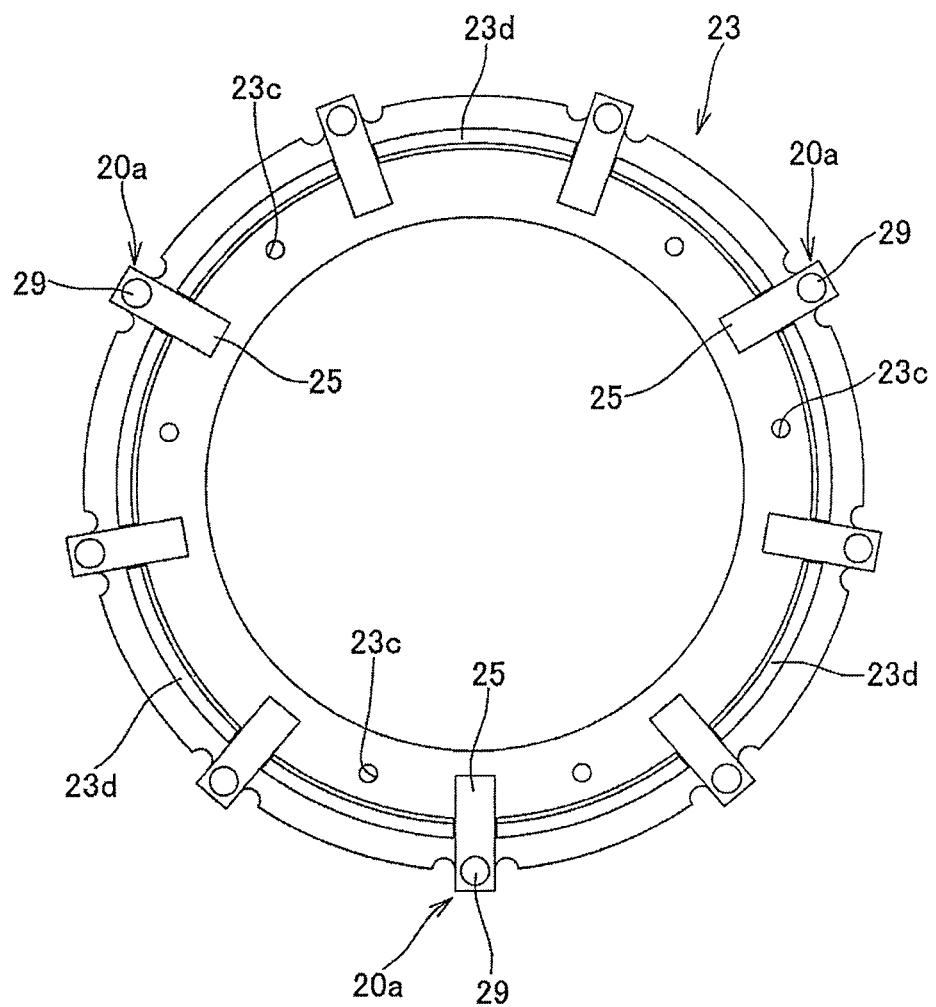
FIG. 6 is a front view of a pressure plate.
Figure 7:
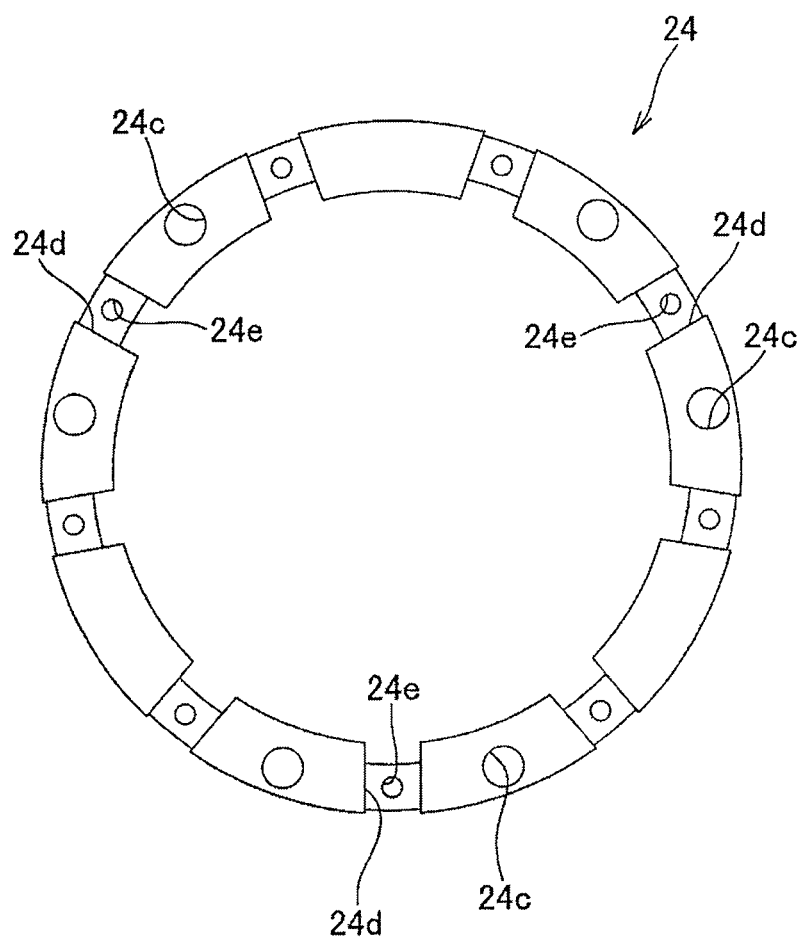
FIG. 7 is a rear view of an intermediate ring.
Figure 8:
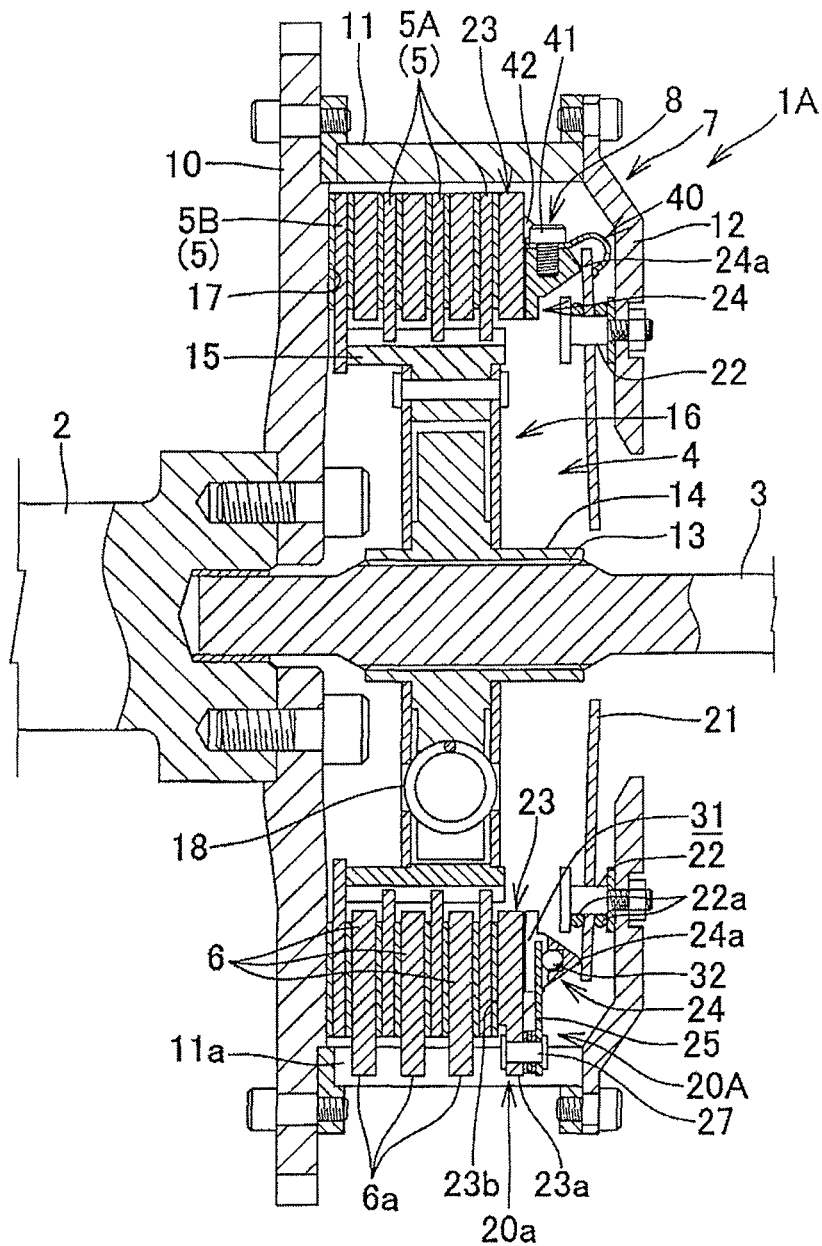
FIG. 8 is a vertical section view of a clutch device in another arrangement.
Figure 9:
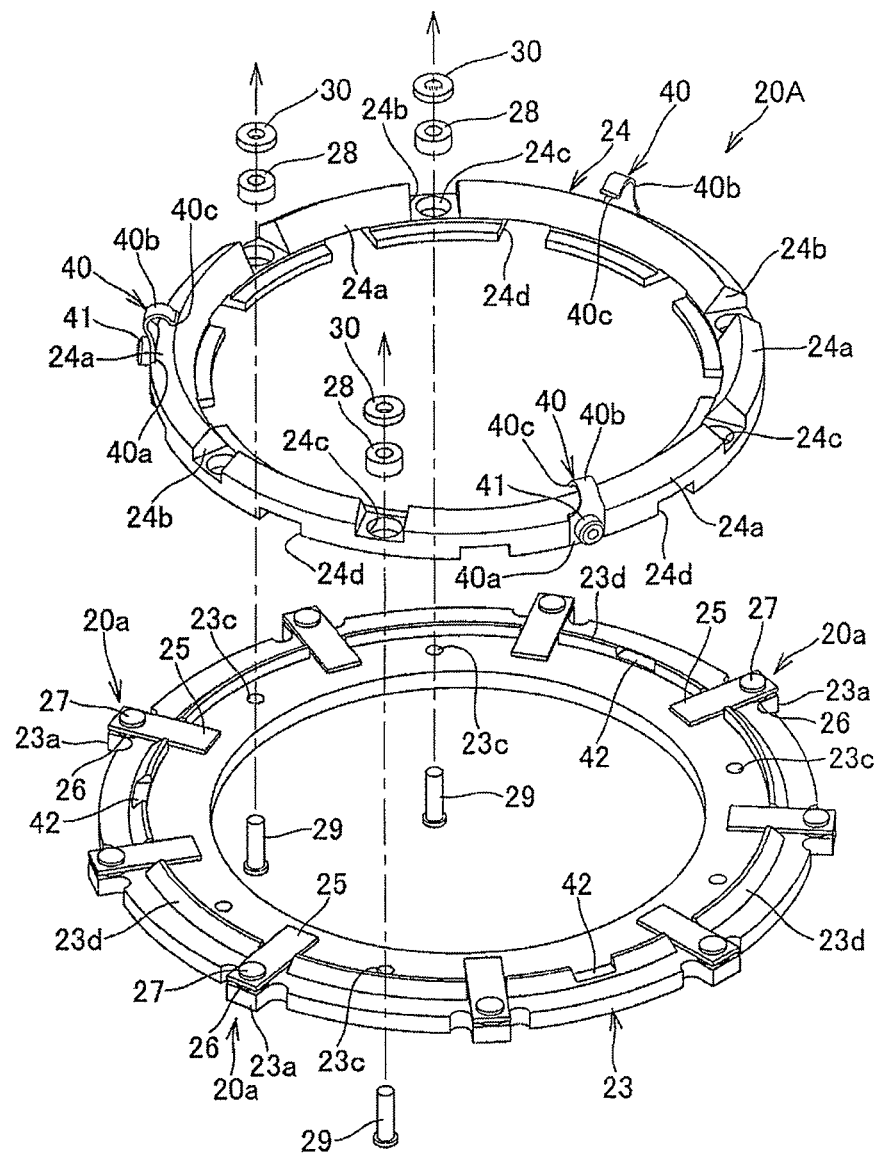
FIG. 9 is an exploded perspective view of a pressure plate assembly of the clutch device in the other arrangement.
Figure 10:
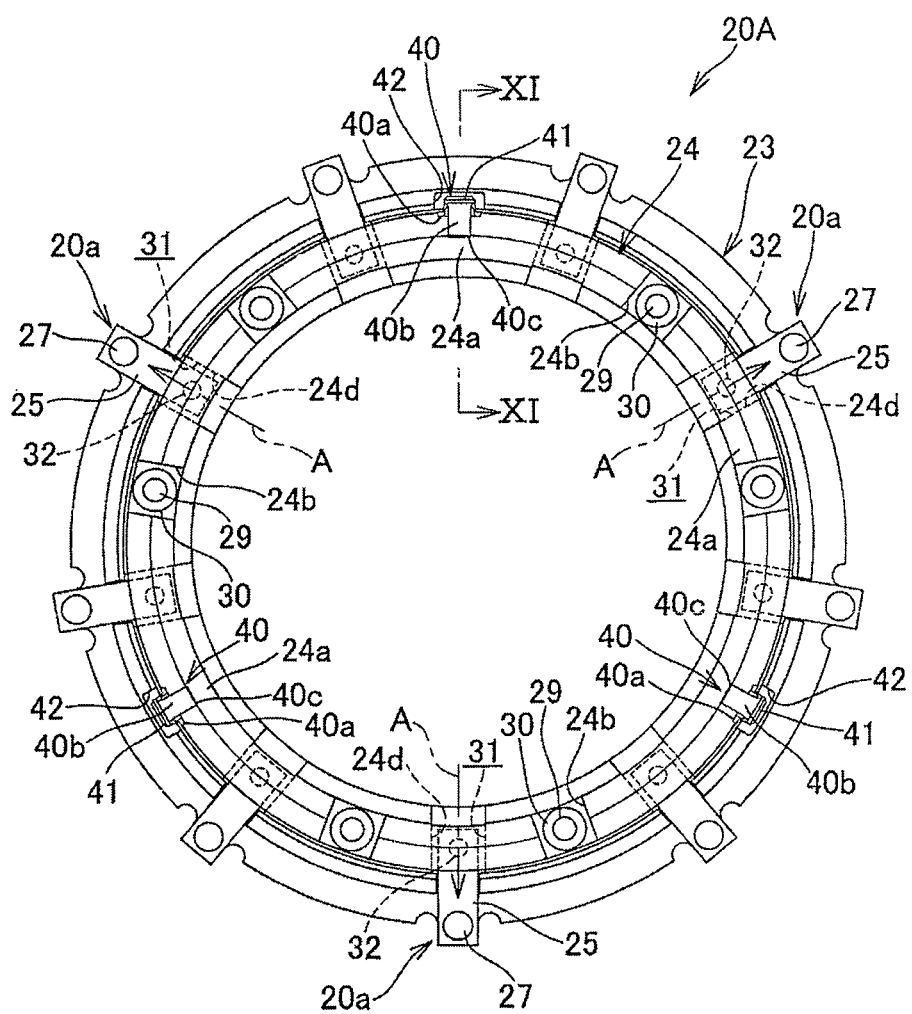
FIG. 10 is a front view of the pressure plate assembly of the clutch device in the other arrangement.
Figure 11:
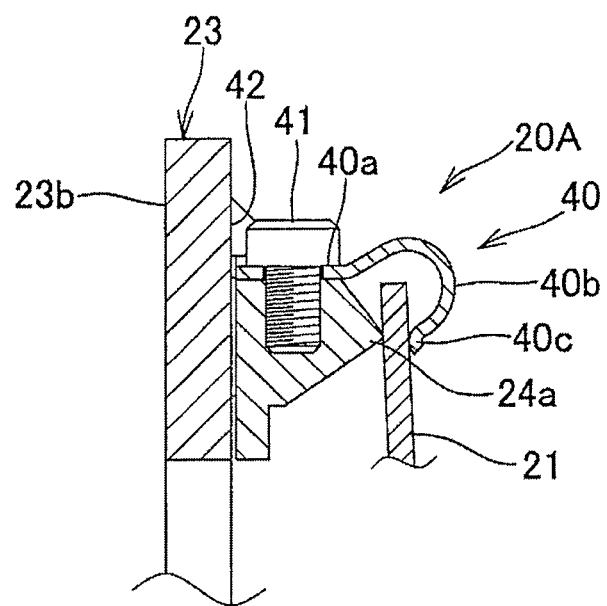
FIG. 11 is a cross section view of FIG. 10 along XI-XI line.

As shown in FIG. 1, a clutch device 1 is located between a crankshaft 2 of the engine and an input shaft 3 of the transmission to transfer a rotating force of the crankshaft 2 to the input shaft 3 in an engageable/disengageable manner. The clutch device 1 includes: a plurality of inner clutch plates 5 provided on the input shaft 3 via a disc support member 4 in a manner capable of axial movement and incapable of relative rotation; outer clutch plates 6 between the adjacent inner clutch plates 5, the outer clutch plates 6 being disposed on a clutch housing 7 rotating integrally with the crankshaft 2, in a manner capable of axial movement and incapable of relative rotation; and an operation means 8 that operates both the clutch plates 5 and 6 in the axial direction into an engagement position where the clutch plates 5 and 6 are pressed against each other and a disengagement position where the same are separated from each other. The clutch device 1 is configured as described below. In this embodiment described below, the present invention is applied to the multi-plate clutch device 1 including the plurality of inner clutch plates 5 and the plurality of outer clutch plates 6. However, the present invention is also applicable to a single-plate clutch device in which a single inner clutch plate is sandwiched between a flywheel and the pressure plate 23.

An almost disc-shaped flywheel 10 is fixed with a bolt to a rear end of the crankshaft 2. An almost cylindrical housing 11 projects backward near an outer periphery of the flywheel 10. An annular cover member 12 is fixed to a rear end of the housing 11 so as to extend toward an inner periphery of the housing 11. The clutch housing 7 is made up of the flywheel 10, the housing 11, and the cover member 12, and is fixed to the rear end of the crankshaft 2 so as to rotate integrally with the crankshaft 2.

A front end of the input shaft 3 is inserted into the clutch housing 7 and attached rotatably to a middle of the rear end of the crankshaft 2. A spline shaft part 13 is formed near the front end of the input shaft 3 in the clutch housing 7.

The disc support member 4 includes: a center boss 14 engaging with the spline shaft part 13 of the input shaft 3 in a manner capable of axial movement and incapable of relative rotation; a ring gear 15 provided on the center boss 14 in a manner incapable of axial movement and capable of relative rotation within a specific angular range; and a buffer means 16 buffering a rotating force from the ring gear 15 to the center boss 14. The center boss 14 and the input shaft 3 may be engaged in an arbitrary structure such as structures using spline engagement or with a key and a key groove, as far as the engagement structure is capable of relative axial movement and incapable of relative rotation. In addition, the buffer means 16 is configured in a well-known manner as to buffer fluctuations in rotating force from the inner clutch plates 5 to the input shaft 3 by a spring member 18 made of a compressed coil spring. The buffer means 16 may be omitted.

Three first inner clutch plates 5A are engaged with the ring gear 15 of the disc support member 4 in a manner capable of axial movement and incapable of relative rotation. A second inner clutch plate 5B is fixed to the front end of the ring gear 15 with a bolt, a screw, or by welding or the like. As above, when the clutch device 1 is assembled as shown in FIG. 1 with the second inner clutch plate 5B fixed to the ring gear 15, the ring gear 15 is restricted in relative movement to the second inner clutch plate 5B, which prevents the inner clutch plates 5 from falling off to the front side of the ring gear 15. In addition, by fixing the second inner clutch plate 5B to the ring gear 15, it is possible to prevent occurrence of a backlash between the ring gear 15 and the inner clutch plates 5, thereby achieving improvement of clutch operability. Although the front-end inner clutch plate 5 is fixed to the ring gear 15 in this embodiment, the same advantage can be obtained by fixing any of the inner clutch plates 5 to the ring gear 15. In addition, the ring gear 15 and the first inner clutch plates 5A may be engaged in an arbitrary structure such as structures using spline engagement or with a key and a key groove, as far as the engagement structure is capable of relative axial movement and incapable of relative rotation.

The annular outer clutch plates 6 are disposed between the adjacent inner clutch plates 5. Slits 11a are formed in the housing 11 so as to extend axially at regular circumferential intervals. Engagement projections 6a are formed on outer peripheries of the three outer clutch plates 6 so as to engage in the slits 11a. The outer clutch plates 6 are attached to the housing 11 in a manner capable of axial movement and incapable of relative rotation, by engagement between the slits 11a and the engagement projections 6a. The outer clutch plates 6 and the housing 11 may be engaged in any structure an arbitrary structure such as structures using spline engagement or with a key and a key groove, as far as the engagement structure is capable of relative axial movement and incapable of relative rotation.

The number of the inner clutch plates 5 can be set arbitrarily, and the number of the outer clutch plates 6 is set smaller by one than that of the inner clutch plates 5. Preferably, the number of the inner clutch plates 5 is two to four because the number of five or more disables these clutch plates 5 and 6 to be attached to the existing housing 11.

The operation means 8 switching the clutch plates 5 and 6 between engaged and disengaged states will be described below. As shown in FIG. 1, the flywheel 10 has an annular receiving plane 17 facing the second inner clutch plate 5B. An annular pressure plate assembly 20 is interposed between the cover member 12 and the inner clutch plates 5 to operate the inner clutch plates 5 toward the flywheel 10. Engagement projections 20a of the same shape as the engagement projections 6a of the outer clutch plates 6 are formed on an outer periphery of the pressure plate assembly 20 so as to engage in the slits 11a of the housing 11. The pressure plate assembly 20 is attached to the housing 11 in a manner capable of axial movement and incapable of relative rotation. A diaphragm spring 21 is fixed to a front side of the cover member 12 via a plurality of support pins 22. The pressure plate assembly 20 is biased constantly by the diaphragm spring 21 toward the clutch plates 5 and 6, whereby the clutch plates 5 and 6 are sandwiched between the pressure plate assembly 20 and the receiving plane 17 to thereby keep the clutch in an engaged state.

At a rear side of the diaphragm spring 21, an operating member not shown is externally attached to the input shaft 3 in a manner capable of axial movement. When the clutch pedal is depressed, the operating member moves frontward to operate an inner periphery of the diaphragm spring 21 toward the flywheel 10. Then, the diaphragm spring 21 is bent back around a pair of front and rear diaphragm rings 22a on outer peripheries of the support pins 22. Accordingly, the outer periphery of the diaphragm spring 21 is separated from a contact part 24a of the pressure plate assembly 20, whereby the clutch is disengaged.

The pressure plate assembly 20, as shown in FIGS. 1 to 7, includes: the pressure plate 23; the intermediate ring 24 provided on the rear side of the pressure plate 23 in a manner capable of slight movement in a direction of pressing by the diaphragm spring 21 (front-back direction); and the plate springs 25 biasing constantly the intermediate ring 24 and the pressure plate 23 in a direction of separating from each other.

The pressure plate 23 is formed by an almost flat ring-shaped member. The pressure plate 23 has on an outer periphery thereof engagement projections 23a projecting at regular circumferential intervals to engage in the slits 11a of the housing 11. The pressure plate 23 has on a front surface thereof an almost flat pressing plane 23b facing the inner clutch plates 5 in a manner capable of being pressed against the rear-end inner clutch plate 5. The pressure plate 23 has on a rear surface thereof positioning projections 23d projecting backward at regular circumferential intervals to position the intermediate ring 24 with respect to the pressure plate 23. The pressure plate 23 has on a rear side thereof the rectangular plate springs 25 disposed radially through the adjacent positioning projections 23d at regular circumferential intervals in correspondence with the engagement projections 20a on the pressure plate 23. Each of the plate springs 25 is fixed at an outer peripheral end thereof with a rivet 27 via a washer 26 to the engagement projection 20a. Each of the plate springs 25 is supported via the washer 26 in a cantilever fashion at a specific interval from the rear surface of the pressure plate 23. Accordingly, it is possible to fix the plate springs 25 at the engagement projections 23a using dead spaces in the slits 11a of the housing 11. In addition, the fixed positions of the plate springs 25 are separated as much as possible from sliding parts of the clutch plates 6 generating heat in a half-clutch state. This makes it possible to minimize heat transfer to the plate springs 25 and prevent the plate springs 25 from decreasing in spring characteristics due to thermal deterioration.

The pressure plate 23 has the annular intermediate ring 24 on the rear surface thereof at an inner peripheral side. The intermediate ring 24 has on a rear surface thereof ring-shaped contact parts 24a with angle sections projecting rearward at regular circumferential intervals. Each of the contact parts 24a has an end (rear end) capable of being pressed against the outer periphery of the diaphragm spring 21. Air grooves 24b are formed between the adjacent contact parts 24a to generate flows of air in the air grooves 24b from the inner to outer peripheries of the intermediate ring 24 by a centrifugal force resulting from rotation of the intermediate ring 24 to cool down the diaphragm spring 21 by the flows of air. The intermediate ring 24 has attachment holes 24c formed in the air grooves 24b. The pressure plate 23 has through holes 23c smaller in minor diameter than the attachment holes 24c in correspondence with the attachment holes 24c. Sleeves 28 of a specific length are attached to the attachment holes 24c. The intermediate ring 24 and the pressure plate 23 are coupled to each other with rivets 29 passing through the sleeves 28 and the through holes 23c in a manner capable of slight movement in the direction of pressing by the diaphragm spring 21 (front-back direction) by a distance L in which a depth of the attachment hole 24c is subtracted from the length of the sleeve 28. In addition, reference numeral 30 denotes a washer for retaining the rivet 29. The washers 30 may be omitted by forming flanges at ends of the sleeves 28.

The intermediate ring 24 has on a front surface thereof groove parts 24d extending radially at regular circumferential intervals in correspondence with the plate springs 25. When the intermediate ring 24 is attached to the pressure plate 23, air passageways 31 are formed by the groove parts 24d, through which the plate springs 25 pass, between the intermediate ring 24 and the pressure plate 23. The intermediate ring 24 has longitudinal attachment holes 24e formed so as to be opened to centers of the groove parts 24d. Steel balls 32 are embedded and fixed to the attachment holes 24e in a manner as to partially project frontward. When the intermediate ring 24 is fixed with the rivets 29 to the pressure plate 23, the other ends of the plate springs 25 are pressed against the steel balls 32, and the intermediate ring 24 and the pressure plate 23 are constantly biased in the direction of separating from each other. In addition, when the plate springs 25 are attached between the intermediate ring 24 and the pressure plate 23, the plate springs 25 is in contact with the pressure plate 23 via the rivets 27 and the washers 26, and in point-contact with the intermediate ring 24 via the steel balls 32. Other portions of the plate springs 25 are separated from the pressure plate 23 and the intermediate ring 24 to thereby minimize heat transfer to the plate springs 25. Meanwhile, flows of air are generated in the air passageways 31 from the inner to outer peripheral sides of the intermediate ring 24 and the pressure plate 23 by a centrifugal force resulting from rotation of the intermediate ring 24. Therefore, the plate springs 25 are cooled down efficiently.

Figure 12:
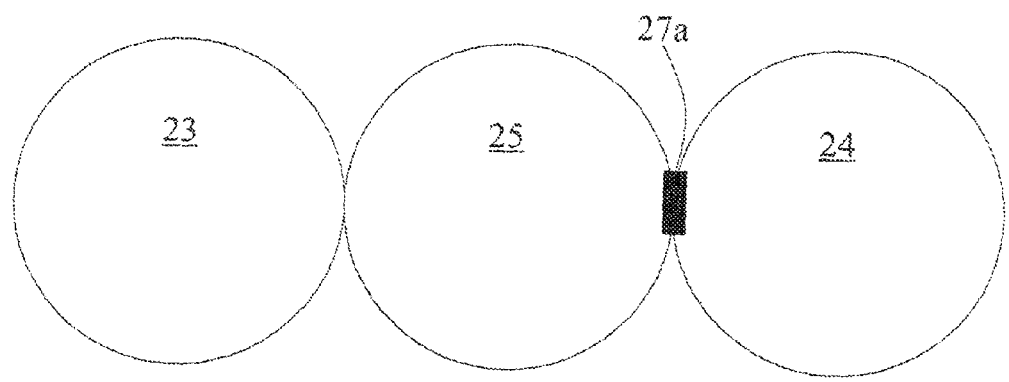
FIG. 12 is an abstract representation of another embodiment of the clutch device of the present invention.

Although in this embodiment, the plate springs 25 are fixed at outer peripheral ends to the pressure plate 23, the plate springs 25 may be fixed at inner peripheral ends to the pressure plate 23 and supported in a cantilever fashion with respect to the pressure plate 23. In addition, although the plate springs 25 are radially fixed to the pressure plate 23, the plate springs 25 may be arranged in a manner as to be inclined with respect to the radial direction or arranged in a circumferential direction. Further, the intermediate ring 24 may have projections contacting the plate springs 25, instead of the steel balls 32, Still further, the plate springs 25 may be fixed to the intermediate ring 24 and the steel balls 32 may be fixed to the pressure plate 23 so as to contact the ends of the plate springs 25. Moreover, with regard to the structure of engagement between the outer clutch plates 6, the pressure plate 23 and the housing 1, longitudinal streaks may be formed on the inner peripheral surface of the housing 11 so as to project inward, and groove parts may be formed on the outer clutch plates 6 and the pressure plate 23 so as to engage in the projecting streaks. In this case, the plate springs 25 are fixed at outer peripheral ends thereof to projecting parts on the pressure plate 23 for forming the groove parts. In yet another embodiment the plate spring 25 may be fixed at one end thereof to intermediate ring 24, the other end thereof contacting the pressure plate 23, as shown in an abstract representation in FIG. 12, wherein drawing component 27a represents a fixing means.

Next, an operation of the clutch device 1 will be described below.

When the clutch pedal is not depressed, the intermediate ring 24, the plate springs 25, and the pressure plate 23 are collectively pressed by a biasing force of the diaphragm spring 21 toward the flywheel 10, the clutch plates are sandwiched in a non-slidable manner between the pressure plate 23 and the flywheel 10 to engage the clutch and transfer a rotating force of the engine to the input shaft 3 of the transmission. At that time, the plate springs 25 are elastically deformed by a biasing force of the diaphragm spring 21, and the intermediate ring 24 and the pressure plate 23 are held close to each other.

Meanwhile, when the clutch pedal is depressed, the diaphragm spring 21 is separated from the intermediate ring 24, and the clutch plate runs idle between the pressure plate 23 and flywheel 10. Accordingly, the clutch is disengaged so as not to transfer a rotating force of the engine to the transmission. At that time, the plate springs 25 try to return to the original shape, and the intermediate ring 24 and the pressure plate 23 are separated from each other.

In addition, when the depressed clutch pedal is somewhat released, the intermediate ring 24, the plate springs 25, and the pressure plate 23 are pressed by the diaphragm spring 21 toward the flywheel 10. First, the inner clutch plates 5 slide over the outer clutch plates 6 between the pressure plate 23 and the flywheel 10 to thereby create a half-clutch state in which part of a rotating force is transferred to the inner clutch plates 5. When the clutch pedal is further released, the plate springs 25 are elastically deformed by a biasing force of the diaphragm spring 21 to keep the half-clutch state. When the clutch pedal is still further released, the clutch plates 5 and 6 are sandwiched in a non-slidable manner between the pressure plate 23 and the flywheel 10 to thereby engage the clutch.

As stated above, the clutch device 1 creates a half-clutch state by the diaphragm spring 21 and the plate springs 25, which makes it possible to set a wider half-clutch range, improve operability at clutch engagement, and prevent effectively occurrence of a shock due to sudden clutch engagement, as compared to the case of creating a half-clutch state only by the diaphragm spring 21. In addition, the air passageways 31 are provided radially at regular circumferential intervals between the intermediate ring 24 and the pressure plate 23 so that the inner and outer peripheral sides communicate with each other, whereby flows of air are generated in the air passageways 31 from the inner to outer peripheral sides when the intermediate ring 24 and the pressure plate 23 rotate integrally with the flywheel 10, as shown by arrows A in FIG. 3. This allows the air passing through the air passageways 31 to cool down efficiently the plate springs 25 in the air passageways 31. Accordingly, it is possible to prevent effectively the plate springs 25 from being thermally deteriorated by heat of friction generated at clutch operations, keep the half-clutch range wide for a long period of time, and curb effectively occurrence of a shock due to sudden clutch engagement for a long period of time. The number, width, length, thickness, and constant of the plate spring 25 are set in such a manner as to obtain a half-clutch state by elastic deformation of the plate springs 25.

Alternatively, as in a pressure plate assembly 20A of a clutch device 1A shown in FIGS. 8 to 11, hook-shaped spring members 40 may be provided as biasing means on the intermediate ring 24 at preset circumferential intervals so that the outer periphery of the diaphragm spring 21 is constantly biased by the spring members 40 toward the side of contact with the intermediate ring 24 (front side).

Each of the spring members 40 may preferably employ a plate spring including: an attachment part 40a fixed with a bolt member 41 to the outer peripheral surface of the intermediate ring 24; a hook part 40b formed by extending the attachment part 40a backward and curving the same toward the center of the intermediate ring 24; and a contact part 40c formed by curving a leading end of the hook part 40b backward. The spring members 40 are each fixed with the bolt members 41 to the outer peripheral surface of the intermediate ring 24 at circumferentially trisected positions. These three spring members 40 are engaged at insides thereof with the diaphragm spring 21 from the back side, and are hooked at the leading ends of the hook parts 40b on the rear surface of the outer periphery of the diaphragm spring 21. Accordingly, the outer periphery of the diaphragm spring 21 is sandwiched between the contact parts 24a of the intermediate ring 24 and the contact parts 40c of the spring members 40. This allows the outer periphery of the diaphragm spring 21 to be constantly biased toward the side of contact with the intermediate ring 24. However, the spring members 40 may be arranged in any manner as far as the arrangement is capable of biasing the outer periphery of the diaphragm spring 21 toward the intermediate ring 24. In addition, the diaphragm spring 21 may have holes or the like in which the leading ends of the hook parts 40b are engaged. In the diagram, reference numeral 42 denotes a notch formed in the positioning projection 23d in correspondence with the spring member 40 and the bolt member 41 to thereby avoid interference between the spring member 40, the bolt member 41, and the positioning projection 23d.

An arbitrary number of spring members 40 may be provided as far as these members can produce a balanced biasing force acting on the diaphragm spring 21 in the circumferential direction. However, an increasing number of spring members 40 might lead to higher manufacturing costs or complicated assembly operations. Therefore, for example, three to six spring members 40 may be provided on the outer periphery of the intermediate ring 24 at regular circumferential intervals.

The clutch device 1A basically allows clutch operations in the same manner as those in the clutch device 1. However, when the clutch pedal is depressed, the pressure plate assembly 20 moves backward smoothly as a whole via the spring members 40 integrally with the outer periphery of the diaphragm spring 21, thereby to create a gap between the pressure plate 23 and the clutch plates. Accordingly, the clutch device 1A achieves smooth and quick idling of the clutch plates, significant improvement of crispness in clutch disengagement, and smooth and quick shift transmission, as compared with the case with the clutch device 1 allowing the clutch plates to run idle while pressing the pressure plate assembly 20 backward to widen a gap between the pressure plate 23 and the flywheel 10.

The clutch device 1A brings about the same advantages as those of the clutch device 1. Besides, in the clutch device 1A, the intermediate ring 24 tries to move integrally with the diaphragm spring 21 by a biasing force of the spring members 40. Therefore, it is possible to improve crispness in clutch disengagement significantly and realize smooth and quick shift transmission. Such smooth and quick shift transmission makes it possible to protect the transmission with raised durability. In addition, this arrangement provides reliable response to rapid shift transmission, which can contribute to acceleration of times in races or others. Further, when the pressure plate assembly 20 becomes operated positively and the clutch pedal is depressed, the clutch can be surely disengaged to absorb discomfort vibrations such as judder by elastic deformation of the plate springs 25 in a reliable manner.

Meanwhile, when the clutch pedal is released, engine output can be transferred in a reliable manner. The spring members 40 may be fixed to the pressure plate 23, not to the intermediate ring 24. In this case, however, the plate springs 25 are elastically deformed by a biasing force of the spring members 40, thereby making the half-clutch range narrower. In addition, vibrations such as judder may be generated in a half-clutch state as in conventional devices, or the clutch may be deteriorated in operability at clutch engagement. Accordingly, the spring members 40 are preferably provided on the intermediate ring 24 so as not to exert any influence on elastic deformation of the plate springs 25.

DESCRIPTION OF REFERENCE NUMERALS

1 Clutch device
2 Crankshaft
3 Input shaft
4 Disc support member
5 Inner clutch plate
5A Inner clutch plate
5B Inner clutch plate
6 Outer clutch plate
6a Engagement projection
7 Clutch housing
8 Operation means
10 Flywheel
11 Housing
11a Slit
12 Cover member
13 Spline shaft
14 Center boss
15 Ring gear
16 Buffer means
17 Receiving plane
18 Spring member
20 Pressure plate assembly
20a Engagement projection
21 Diaphragm spring
22 Support pin
22a Diaphragm ring
23 Pressure plate
23a Engagement projection
23b Pressing plane
23c Through hole
23d Positioning projection
24 Intermediate ring
24a Contact part
24b Air groove
24c Attachment hole
24d Groove part
24e Attachment hole
25 Plate spring
26 Washer
27 Rivet
28 Sleeve
29 Rivet
30 Washer
31 Air passageway
32 Steel ball
1A Clutch device
20A Pressure plate assembly
40 Spring member
40a Attachment part
40b Hook part
40c Contact part
41 Bolt member
42 Notch

The invention claimed is:

1. A clutch device arranged in such a manner that a pressure plate rotating integrally with a flywheel is pressed via a diaphragm spring toward the flywheel to thereby sandwich clutch plates rotating integrally with an input shaft of a transmission between the flywheel and the pressure plate and transfer a rotating force of an engine to the transmission; and the pressure plate is released from the pressing operation of the diaphragm spring to thereby let the clutch plates run idle between the flywheel and the pressure plate and sever the transfer of rotating force from the engine to the transmission, wherein an intermediate ring is disposed on the pressure plate between the pressure plate and the diaphragm spring so as to be slightly movable in a direction of pressing by the diaphragm spring;

air passageways, defined by radially directed grooves in the intermediate ring, are disposed at regular circumferential intervals between the intermediate ring and the pressure plate so as to let inner and outer peripheries of the intermediate ring and the pressure plate communicate with each other;

a plate spring is disposed in each air passageway to bias constantly the intermediate ring and the pressure plate in a direction of separating from each other, in such a manner that one end thereof is fixed to the pressure plate and the other end thereof applies a force to the intermediate ring; and a force of the pressing operation by the diaphragm spring is transferred to the pressure plate via the intermediate ring and the plate springs.

2. The clutch device according to claim 1, wherein gaps are created between the intermediate ring, the pressure plate, and front and back sides of the plate springs, and the plate springs are disposed in the air passageways.

3. The clutch device according to claim 1 or 2, wherein each plate spring is fixed at one end to the pressure plate on the outer circumferential side of the intermediate ring.

4. The clutch device according to claim 1 or 2, wherein each plate spring is fixed at one end to the pressure plate on the outer peripheral side of sliding parts of the clutch plates and the pressure plate.

5. The clutch device according to claim 1 or 2, wherein parts of the intermediate ring contacting with the diaphragm spring, are formed in a ring shape with an angle section at regular circumferential intervals, air grooves for cooling down the diaphragm spring are formed between adjacent contact parts, and the intermediate ring is coupled to the pressure plate by rivets in the air grooves.

6. The clutch device according to claim 1 or 2, wherein the intermediate ring has a biasing means for biasing constantly the diaphragm spring toward contact with the intermediate ring.

7. The clutch device according to claim 6, wherein, as the biasing means, hook-shaped spring members are disposed on the intermediate ring at preset circumferential intervals in such a manner that one end thereof is hooked on the outer periphery of the diaphragm spring and the other end thereof is fixed to the intermediate ring.

8. A clutch device arranged in such a manner that: a pressure plate rotating integrally with a flywheel is pressed via a diaphragm spring toward the flywheel to thereby sandwich clutch plates rotating integrally with an input shaft of a transmission between the flywheel and the pressure plate and transfer a rotating force of an engine to the transmission; and the pressure plate is released from the pressing operation of the diaphragm spring to thereby let the clutch plates run idle between the flywheel and the pressure plate and sever the transfer of rotating force from the engine to the transmission, wherein an intermediate ring is disposed on the pressure plate between the pressure plate and the diaphragm spring so as to be slightly movable in a direction of pressing by the diaphragm spring;

air passageways, defined by radially directed grooves in the intermediate ring, are disposed at regular circumferential intervals between the intermediate ring and the pressure plate so as to let inner and outer peripheries of the intermediate ring and the pressure plate communicate with each other;

a plate spring is disposed in each air passageway to bias constantly the intermediate ring and the pressure plate in a direction of separating from each other, in such a manner that one end thereof is fixed to the pressure plate and the other end thereof applies a force to the intermediate ring; and a force of the pressing operation by the diaphragm spring is transferred to the pressure plate via the intermediate ring and the plate springs, a force of the pressing operation by the diaphragm spring is transferred to the pressure plate via the intermediate ring and the plate springs, wherein a steel ball is embedded and fixed to the intermediate ring in such a manner as to be partly exposed to the outside, and the other end of the plate spring is in contact with the steel ball.

9. The clutch device according to claim 8, wherein gaps are created between the intermediate ring, the pressure plate, and front and back sides of the plate springs, and the plate springs are disposed in the air passageways.

* * * * *